Sept. 8, 1931.   R. A. BEEKMAN   1,822,721
SHIP PROPULSION SYSTEM
Filed Oct. 31, 1928
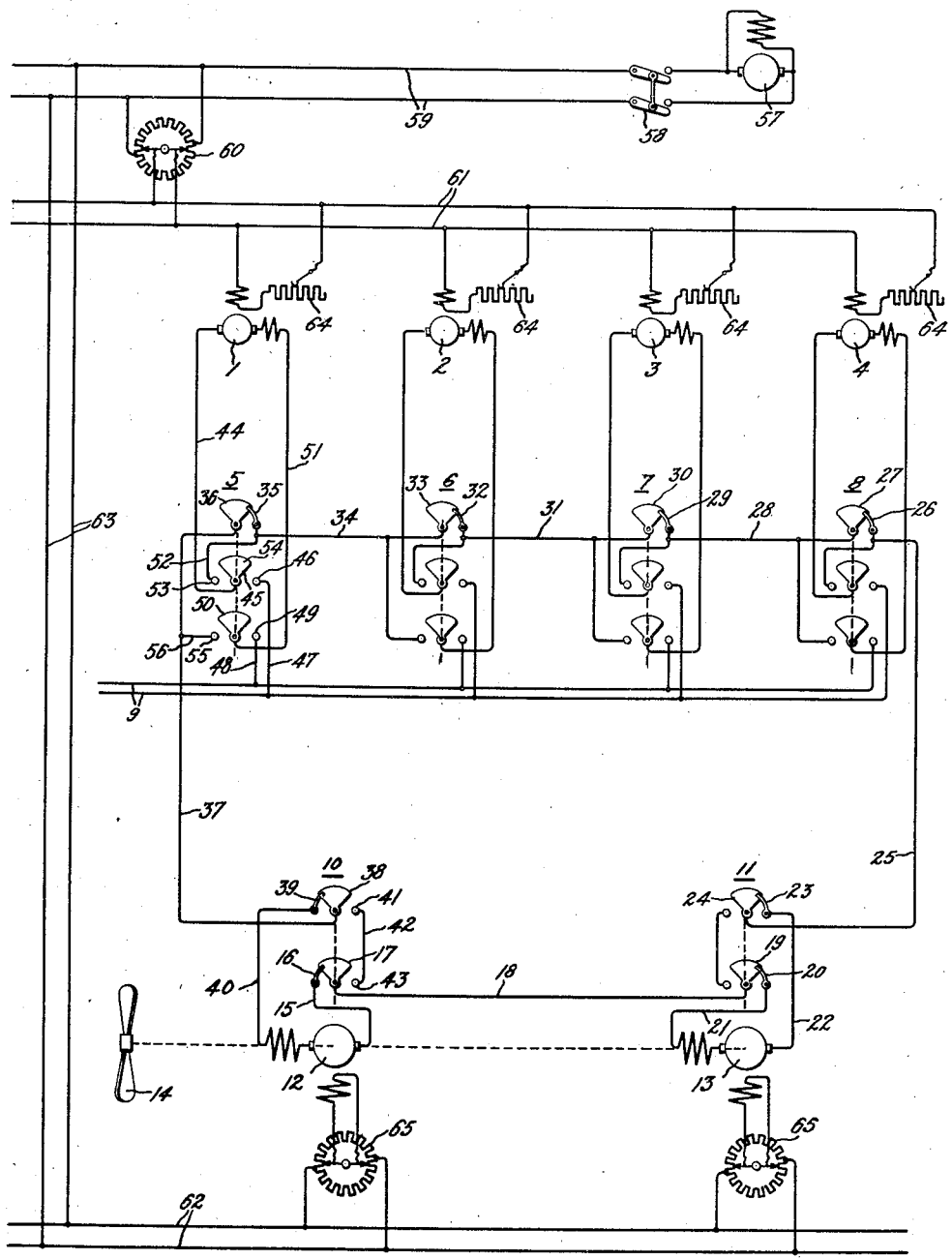
Inventor:
Royce A. Beekman,
by Charles E. Tullar
His Attorney.

Patented Sept. 8, 1931

1,822,721

UNITED STATES PATENT OFFICE

ROYCE A. BEEKMAN, OF SCHENECTADY, NEW YORK, ASSIGNOR TO GENERAL ELECTRIC COMPANY, A CORPORATION OF NEW YORK

SHIP PROPULSION SYSTEM

Application filed October 31, 1928. Serial No. 316,183.

My invention relates to electric power systems and methods of operating the same whereby the motor speed may be varied without producing motor instability or loss of motor torque. More particularly, my invention relates to a particular arrangement of apparatus and a method of operating the same in systems in which the power and torque demand of the load increases and decreases much more rapidly than does its speed, as for example in ship propulsion systems.

The power demand of the screw or wheel of a ship varies approximately as the cube of its speed, and the torque as the square of its speed. Assuming the variation in power as being proportional to the cube of the speed and, therefore, the torque proportional to the square of the speed (the actual propeller curve is usually very close to this) it will be seen that the following conditions exist:

| Power | Speed | Torque |
|---|---|---|
| 100 per cent | 100 per cent | 100 per cent. |
| 75 per cent | 91 per cent | 83 per cent. |
| 50 per cent | 79.5 per cent | 63 per cent. |
| 25 per cent | 63 per cent | 39.7 per cent. |

It is common practice to employ in a ship propulsion system a plurality of independently driven generators which are connected in series with the propulsion motor or motors. The following are some of the reasons for this practice: (1) Higher speed available in the smaller units, (2) greater reliability due to the possibility of shutting down part of the plant without interfering with the rest of the plant, (3) greater flexibility in adapting the needs to periodical demands such as occur in ferry boat service, etc. In order that the generators may be interchangeable their normal rating as to current and voltage are usually made the same but not necessarily so.

In such a system including four generating units if only three of the units are available, the power available is then only 75% and the voltage available is likewise only 75%. Therefore, if the propulsion motor characteristics are left unchanged, only 75% speed will be obtained. It will be noted, however, from the above table showing the relationship between power, speed and torque that 91% propeller speed is necessary to absorb 75% power and, therefore, that a means must be found for changing the motor speed if the total available power is to be consumed. This is usually done by weakening the motor field and under some of the conditions of operation this field weakening may become so great for a particular design of motor as to cause instability and even loss of torque.

In like systems it has already been proposed to load fully those generators retained in circuit when operating with less than the full number of generators and to overcome instability and loss of motor torque by employing a plurality of series connected motors for driving the propeller and varying the speed of the propeller by weakening the field of only one of said motors. By resorting to this method of operation it is possible to secure the desired speed variation of the propeller without producing instability due to the fact that full field on the other motors causes them to operate at full torque and under stable conditions. This proposed method of operation is described and claimed in the copending application of Robert D. Van Nordstrand, Serial No. 319,093, for ship propulsion systems, filed November 13, 1928, and assigned to the same assignee as the present application.

It is an object of my invention to load fully those generators retained in circuit when operating with less than the full number of generators and to overcome instability and loss of motor torque under such conditions by employing a plurality of series connected motors for driving the propeller and causing one of said motors to operate as a generator to boost the applied motor voltage and increase the motor speed and power consumption sufficiently to load fully those generators connected in the motor circuit.

My invention will be better understood from the following description taken in connection with the accompanying drawing and its scope will be pointed out in the appended claims.

The single figure of the accompanying drawing illustrates diagrammatically a ship propulsion system including four generators and two motors. The generators 1, 2, 3, 4 may be connected through switches 5, 6, 7, 8 to auxiliary apparatus connected to power mains 9 or through additional switches 10 and 11 to motors 12 and 13 mechanically connected to the propeller 14. With the switches in the position illustrated in the drawing the several generators are disconnected from the system and the motors 12 and 13 are connected in a local circuit as follows: Motor 12, conductor 15, switch contact 16, switch blade 17, conductor 18, switch blade 19, switch contact 20, conductor 21, motor 13, conductor 22, switch contact 23, switch blade 24, conductor 25, switch contact 26, switch blade 27, conductor 28, switch contact 29, switch blade 30, conductor 31, switch contact 32, switch blade 33, conductor 34, switch contact 35, switch blade 36, conductor 37, switch blade 38, switch contact 39, and conductor 40. Either motor 12 or 13 may be removed from this circuit by operating switches 10 and 11, to the right and left respectively from their positions illustrated in the drawing. The manner in which this is accomplished will be understood from a consideration of the operation of switch 10. If the switch 10 is thrown to the right the motor 12 is removed from the circuit and the circuit completed through switch blade 38, switch contact 41, conductor 42, switch contact 43 and switch blade 17.

As previously stated, the generators 1, 2, 3 and 4 may be connected to the auxiliary apparatus connected to the buses 9 or to the motors 12 and/or 13 by means of the switches 5, 6, 7 and 8. The manner in which this is accomplished will be understood from a consideration of the operation of switch 5, since the operation of the switches 6, 7 and 8 is identical therewith. If the switch 5 is thrown to the right from the position illustrated in the drawing the generator 1 is connected to the auxiliary power busses 9 through conductor 44, switch blade 45, switch contact 46, conductor 47, conductor 48, switch contact 49, switch blade 50 and conductor 51. At the same time it is to be noted that due to the length of the contact segment 35 the circuit through the motors is uninterrupted. If the switch 5 is thrown to the left the circuit through the motors is interrupted between switch contact 35 and switch blade 36 and the circuit is completed through the generator 1 as follows: conductor 34, conductor 52, switch contact 53, switch blade 54, conductor 44, conductor 51, switch blade 50, switch contact 55, conductor 56, to conductor 37 and thence as previously traced.

The generators 1, 2, 3 and 4 and the motors 12 and 13 are excited in the system illustrated by means of a generator 57 which is connected through a switch 58 to a main excitation bus 59. Excitation current is supplied from this bus through a reversing rheostat 60 to the generator excitation bus 61 and through conductors 63 to the motor excitation bus 62. By operation of the reversing rheostat 60 the fields of the generators 1, 2, 3 and 4 may be controlled simultaneously and may also be reversed. Individual adjustments of the fields of the generators 1, 2, 3 and 4 may be accomplished through the agency of rheostats 64 inserted in the individual field circuits of each generator. The fields of the motors 12 and 13 may be reversed as well as controlled as to their intensity by means of reversing rheostats 65. According to the invention it is necessary only to provide one of the motors with such a reversing rheostat or its equivalent but by providing both of the motors with such rheostats it is possible to select either motor to act as a generator, according to the method of operation about to be described.

With two motors such as illustrated in the drawing, and four generating sets, the 50% power condition requires the greatest percentage of field weakening if the motors are to be controlled by weakening their fields in order to increase their speed and load sufficiently to consume the full power of two generators. If under this load condition however the field on but one of the motors is reversed so as to cause it to operate as a generator in order to boost the voltage of the two generators remaining in the circuit it is possible to increase the speed of the propeller and the load on the system without weakening the remaining motor field and thus avoid producing instability which would otherwise occur if it were attempted to speed up the propeller by weakening the fields of both motors sufficiently to attain the desired operating speed of 79.5% for the 50% power condition. Thus, in the system illustrated when due to failure of prime mover generator sets or due to the desire of operating at reduced speed, two of the generators, say 1 and 2, are removed from the circuit by placing the switches 5 and 6 in the position illustrated in the drawing so that power is supplied only from generators 3 and 4, according to my invention I reverse the field on either motor 12 or 13 and adjust this field for such a value as will give a total generated voltage sufficient to cause the propeller to be revolved at that speed necessary to produce that motor load found necessary for completely loading the generators 3 and 4. Thus, without over-exciting the generators 3 and 4 or running them above their normal speed and without decreasing the field strength on the motor acting as a motor it is possible to increase the speed of the propeller the desired amount to fully load the generators.

In view of the above considerations the method of operating with three generators in circuit or with one generator in circuit is believed to be perfectly obvious. It is to be noted however that for the condition of 25% power, one generator in circuit, it is possible to use only one of the motors and ordinarily the field weakening for this particular condition may not be the limit in designing the motor. There will be conditions however where this is not the case and it will be necessary to operate according to my invention even under 25% power conditions.

It is to be understood, of course, that one of the motors may be made to act as a generator by reversing its armature connection in the power circuit as well as by reversing its field, as has been described above. It is also apparent that more than two motors may be used to drive the propeller, it being essential according to the invention only to employ more than one motor for this purpose. The invention is not limited to the employment of any particular number of generators since a plurality of series connected motors controlled according to my invention may be employed in any system where it is desirable to drive a load device at various speeds and avoid that instability of motor operation which would result from operating the motors with weakened fields. Thus although I have shown and described a certain particular embodiment of my invention such modifications and variations are contemplated as fall within the scope of my invention which is set forth in the appended claims.

What I claim as new and desire to secure by Letters Patent of the United States is:

1. A power system including a plurality of series connected generators, means for changing the number of generators connected in series with one another, a load, a plurality of series connected motors mechanically connected to said load, means for connecting said generators to said motors and means for reversing and varying the field of one of said motors.

2. A power system including a plurality of independently driven generators, means for connecting any predetermined number of said generators in series, a load device, a plurality of series connected motors for operating said device, means for connecting said generators to said motors and means for causing one of said motors to operate as a generator to boost the applied motor voltage and motor speed sufficiently to increase the motor load enough fully to load that portion of said generators operating fully excited and at normal speed connected in the load circuit.

3. A power system including a plurality of independently driven generators, means for connecting a predetermined number of said generators in series, a plurality of series connected motors mechanically connected to one another and to a load device whose power demand increases and decreases at a greater rate than its speed, means for connecting said generators in series with one another and with said motors, and means for reversing and controlling the field of one of said motors to boost the applied motor voltage and hence the motor speed sufficiently to consume the full power of that portion of said generators connected in the power circuit.

4. A ship propulsion system including a plurality of series connected generators, means for independently driving said generators, a propeller, a plurality of series connected motors for driving said propeller mechanically connected thereto, means for connecting said generators to said motors, means for varying the number of generators connected in series, and means for causing one of said propeller motors to operate as a generator for increasing the applied motor voltage and motor speed sufficiently to consume the full power of that portion of said generators connected in the power circuit.

5. A ship propulsion system including a plurality of independently driven generators, means for connecting a predetermined number of said generators in series, a propeller, a plurality of series connected motors mechanically connected to one another and to said propeller, means for connecting said generators to said motors, and means for causing one of said propeller motors to operate as a generator to increase the applied motor voltage, sufficiently above the sum of the full voltages of that portion of said generators connected in the power circuit to increase the motor speed and load sufficiently to load fully said generators.

6. The method of operating a power system in which a plurality of motors connected in series are used for driving a load which comprises maintaining full field on all of said motors except one and causing said one motor to operate as a generator to boost the applied voltage in order to increase the motor speed without producing motor instability.

7. The method of operating a power system wherein any predetermined number of generators may be connected in series with a plurality of series connected motors mechanically connected to one another and to a load device whose power demand increases at a greater rate than its speed which includes the acts of changing the number of generators employed to furnish power to the motors and causing one of said motors to operate as a generator to boost the applied motor voltage and motor speed sufficiently to consume the full power of that portion of said generators connected in the power circuit.

8. The method of operating a power system wherein any predetermined number of generators may be connected in series with a plurality of series connected motors mechanically connected to one another and to a load device whose power demand increases and decreases at a greater rate than its speed, which includes the acts of decreasing the number of generators connected in circuit with said motors, and causing one of said motors to operate as a generator to boost the applied motor voltage and motor speed sufficiently above the speed at which the motors would normally operate if connected to said lesser number of generators operating in their previous condition of adjustment to increase the motor load to a value sufficient to load fully said lesser number of generators.

9. The method of operating a ship propulsion system wherein any predetermined number of generators may be connected in series with a plurality of series connected motors mechanically connected to one another and to the ship's propeller, which includes the acts of decreasing the number of generators employed to furnish power to the motors, operating said decreased number of generators at normal speed and with normal excitation, maintaining full field on all but one of said motors and causing said one motor to operate as a generator to boost the applied motor voltage sufficiently to increase the motor speed and load to such a value as will fully load said remaining generators.

In witness whereof, I have hereunto set my hand this 30th day of October, 1927.

ROYCE A. BEEKMAN.